US006013913A

United States Patent [19]

Hanson

[11] Patent Number: 6,013,913

[45] Date of Patent: Jan. 11, 2000

[54] MULTI-PASS REFLECTRON TIME-OF-FLIGHT MASS SPECTROMETER

[75] Inventor: Curtiss D. Hanson, Cedar Falls, Iowa

[73] Assignee: The University of Northern Iowa, Cedar Falls, Iowa

[21] Appl. No.: 09/019,650

[22] Filed: Feb. 6, 1998

[51] Int. Cl.[7] .............................. B01D 59/44; H01J 49/00

[52] U.S. Cl. ........................ 250/287; 250/282; 250/396 R

[58] Field of Search ..................................... 250/287, 282, 250/396 R

[56] References Cited

U.S. PATENT DOCUMENTS

| | | | |
|---|---|---|---|
| 4,072,862 | 2/1978 | Mamyrin et al. | 250/286 |
| 5,118,937 | 6/1992 | Hillenkamp et al. | 250/282 |
| 5,160,840 | 11/1992 | Vestal | 250/287 |
| 5,376,788 | 12/1994 | Standing et al. | 250/287 |
| 5,464,985 | 11/1995 | Cornish et al. | 250/396 R |
| 5,510,613 | 4/1996 | Reilly et al. | 250/287 |
| 5,614,711 | 3/1997 | Li et al. | 250/287 |
| 5,625,184 | 4/1997 | Vestal et al. | 250/287 |
| 5,637,869 | 6/1997 | Bergmann | 250/287 |

OTHER PUBLICATIONS

Brown, R.; Gilfrich, N. Rapid Commun. Mass Spectrom. 1992, 6, 697–701.

Wolf, B.; Macfarlane, R. J.A.S.M.S. 1992, 3, 706–715.

Karas, M.; Bahr, U.; Ingendoh, A.; Hillenkamp, F. Angew. Chem., Int. Ed. Engl., 1989, 28, 760.

Beavis, R.; Chait, B. Rapid Commun. Mass Spectrom., 1989, 3, 233–237.

Beavis, R.; Chait, B. Anal. Chem., 1990, 62, 1838.

Strobel, F. H.; Solouki, T.; White, M. A.; Russell, D. H. J.A.S.M.S. 1991, 2, 91–94.

Opsal, R.; Owens, K.; Reilly, J. Anal. Chem., 1985, 57, 1884–1889.

Macfarlane, R. D. Anal. Chem. 1983, 55, 1250A.

Karas, M.; Hillenkamp, F. Anal. Chem., 1988, 60, 2299.

Hanson, C. D.; Just, C. L. Anal. Chem. 1994, 66, 3676–80.

Kinsel, G. R.; Johnston, M. Int. J. Mass Spectrom Ion Process 1989, 91, 157–176.

deHeer, W.; Milani, P. Rev. Sci. Instrum. 1991, 62, 670–677.

Brown, R.; Gilfrich, N. Anal. Chim. Acta., 1991, 248, 541–552.

Oakey, N.; Macfarlane, R. Nucl. Instrum. Methods, 1967, 49, 220–228.

Geno, P.; Macfarlane, R. Int. J. Mass Spectrom. Ion Proc. 1986, 74, 43–57.

Just, C. L.; Hanson, C. D. Rapid Comm. Mass Spectrom. 1993, 7, 502–506.

*Primary Examiner*—Edward P. Westin
*Assistant Examiner*—Nikita Wells
*Attorney, Agent, or Firm*—Allan L. Harms

[57] ABSTRACT

A novel design for a time-of-flight mass spectrometer capable of tandem mass spectrometry measurements with high resolution and high sensitivity using two variable reflectrons in a co-linear geometry. Variably switched reflectrons are oriented coaxially on opposing ends of the ion flight region allowing multiple passes of the ions along the flight region permitting high resolution, tandem mass spectrometry experiments to be performed. An electrostatic particle guide is incorporated to ensure high ion transmission efficiency in a multi-pass system. In addition to permitting the high transmission efficiency of ions, the EPG can be used in a bipolar pulsed mode to isolate ions of interest for structural study.

11 Claims, 13 Drawing Sheets

MULTI-PASS REFLECTRON TIME-OF-FLIGHT MASS SPECTROMETER

FIELD OF THE INVENTION

This invention relates to the field of mass spectrometry and in particular relates to the apparatus and method for a time-of-flight mass spectrometer with two coaxial reflectrons allowing multiple passes and improved performance.

BACKGROUND OF THE INVENTION

The field of mass spectrometry encompasses an area of analytical chemistry which analyzes substances by measuring the molecular mass of the constituent compounds. In particular, time-of-flight mass spectrometry is a type of mass analysis that uses the principle that ions of the same kinetic energy will have different velocities based on their mass. The ability to accurately determine the mass of a specific sample ion depends on how well the kinetic energy is defined and the sensitivity of the instrument to determine the differences in the times of flight of the ions between two fixed points.

With the increasing importance of biomolecule analysis, time-of-flight mass spectrometry (TOF-MS) is becoming more and more popular in both industrial and academic labs; however the techniques for obtaining structural information from time-of-flight instruments are still very much experimental. Time-of-flight mass spectrometers are the instrument of choice for such analyses because of their high sensitivity and extended mass range which are necessary when studying biomolecules. These instruments have shown sensitivity for samples in the range of a few hundred attomoles and have a theoretically unlimited mass range. Presently, the mass range for time-of-flight instruments is limited by the ionization techniques that are employed. With the introduction of $^{252}$Cf plasma desorption techniques and matrix assisted laser desorption ionization (MALDI), this mass range was extended into the useful range for biomolecule study. Although the sensitivity and mass range of time-of-flight instruments provide a strong argument for their use in biomolecule analysis, the spectra obtained from these methods are often complicated from high intensity background peaks resulting from the matrix solution and residual alkali metal background. This background limits both the resolution and detector response of the technique due to detector saturation, reducing the effectiveness for high-mass analysis. Early instruments built for time-of-flight mass spectrometry improved the resolution of the instrument by increasing the length of the flight tube. By increasing the distance between the source and the detector, ions having small differences in velocity were allowed to become separated in space. Typical flight distances for commercial instruments were often two meters long to provide adequate resolution. In addition to the problems associated with the length of the flight tube, the ability to separate two ions of different masses is limited by small variations in the kinetic energy that is imparted to the ions. The first to address this problem were Wiley and McLaren in 1955 (Wiley, W. C.; McLaren, I. H., *Rev. Sci. Instr.,* 1955, Vol. 26, p. 1150), who developed a method of focusing the kinetic energy differences to a point in space using a pulsed ion source design. Although this approach provides a significant improvement in the resolution in the mass analysis, only a narrow mass region can be focused for any given delay. This approach was modified by Kinsel and coworkers who achieved kinetic energy and spatial focusing by applying a focusing voltage pulse to a short field region located after the source. (Kinsel, G. R.; Johnston, M., (*Int. J. Mass Spectrometer Ion Process* 1989, Vol. 91, pp. 157–176) One of the major advances in focusing kinetic energy differences and thereby improving resolution was the introduction of the ion mirror or ion reflector device first described by Mamyrin. (Mamyrin, B. A.; Karataev, V. I.; Shmikk, D. V.; Zagulin, V. A., *Sov. Phys. JETP,* 1973, Vol. 37, pp. 45–48). This approach works as a velocity focusing device where isobaric ions having a higher velocity due to a small increase in kinetic energy penetrate deeper into the retarding field and thus spend more time being reflected than ions having the same mass but lower kinetic energy. To simplify focusing characteristics and minimize ion loss, initial designs minimized the angle of incidence relative to the ion reflector. This trend led to the development of the coaxial reflectron in which the ions were directed into the mass spectrometer through a small orifice in the center of the detector and then reflected back towards the detector at near zero angles.

Structural analysis in mass spectrometry is usually accomplished by using a technique known as MS/MS (or tandem MS) analysis. In a typical MS/MS experiment, two mass spectrometers are connected in tandem for ion isolation and chemical study of samples containing mixtures. Typically, the first mass spectrometer is used to isolate one particular mass of ion to be studied; this ion packet then enters the second mass spectrometer where it is fragmented and analyzed to obtain structural information. Recently, tandem mass spectrometry experiments have been demonstrated by Cotter (Cornish, Timothy J.; Cotter, Robert J., "Tandem Time-of-Flight Mass Spectrometer", *Anal. Chem.,* 1993, 65(8), 1043–7) using time-of-flight instruments equipped with pulsed plates to perform the ion isolation between two ion reflectors. Although pulsed plates provide a method for ion isolation, the approach required a second analyzer following the pulsed plates. Furthermore pulsed plate deflection of unwanted ions can produce radially inhomogenous field lines which can differentially affect the time of flight of ions based on their radial position in the flight tube requiring a field correcting reflectron analyzer. Radially inhomogenous acceleration causes a spread in axial flight time resulting in loss in resolution in a single stage, linear time-of-flight system.

An alternate approach to ion elimination is the use of an electrostatic particle guide (EPG). The EPG was originally introduced by Macfarlane to improve transmission efficiency of ions. (Oakey, N.; Macfarlane, R., *Nucl. Instrum. Methods,* 1967, Vol. 49, pp. 220–228) However, Macfarlane later demonstrated the utility of the EPG for elimination of neutrals and ion elimination. (Wolf, B.; Macfarlane, R., *J.A.S.M.S.,* 1992, Vol. 3, pp. 706–715) (Geno, P.; Macfarlane, R., *Int. J. Mass Spectrom. Ion Proc.,* 1986, Vol. 74, pp. 43–57) Recently, as described by Hanson and Just in *Analytical Chemistry* Vol. 66 No. 21 at pp. 3676–3680, selective ion elimination has been accomplished using a pulsed bipolar EPG. This approach was shown to effectively eliminate intense, low-mass background ions while increasing the transmission efficiency of higher mass ions. This technique was also found to increase the signal-to-noise ratio by reducing the saturation of the detector. Furthermore, an EPG does not introduce radially inhomogenous field lines and therefore does not result in positionally dependent ion acceleration. A bipolar pulsed electrostatic particle guide can therefore perform ion isolation by utilizing a multi-pulse sequence. In such a sequence, the first pulse is used to eliminate low mass ions while subsequent pulses may be used to eliminate unwanted ions after the ions to be studied have arrived at the detector. In an experiment a bipolar pulsed EPG was used to isolate ions on the basis of their radial flight times and then selected ions were analyzed using the axial flight times. By using this approach, ion isolation is performed with high resolution while maintaining high ion transmittance.

Upon isolating an ion for analysis, a method for analyzing the fragmentation of the selected ion must be employed. This approach normally requires that a second mass analyzer be coupled to the first analyzer in tandem. Connecting two sequential analyzers has always been a source of ion loss and therefore limits the sensitivity of the technique. To address this problem, resolution is often sacrificed to increase the ion transmission. Cotter introduced a double-reflectron system that permits ion selection following velocity focusing coupled to a second time-of-flight region that is capable of analyzing dissociation products with high resolution. (Cornish, Timothy J.; Cotter, Robert J., "Collision-Induced Dissociation in a Tandem Time-of-Flight Mass Spectrometer with Two Single-Stage Reflectrons", *Org. Mass Spectrom.* 1993, 28(10), 1129–34).

SUMMARY OF THE INVENTION

The invention presented here provides an improvement to the prior art by providing a unique geometry time-of-flight mass spectrometer that provides enhanced resolution in a multipass system while maintaining high ion transmission. In accordance with the preferred embodiment, two ion reflectors are oriented co-axially in the flight tube with an electrostatic particle guide as an ion guide between the analyzers. Using fast electrostatic switches, it is possible to orient the source, detector and analyzers on the same axis of ion motion. This approach permits a true zeroangle reflectron geometry with a net increase in the flight length while maintaining both high transmission and resolution. Because there are two co-axial ion reflectors, this geometry permits a multi-pass ion trajectory that makes tandem mass spectrometry experiments possible with both high resolution and high sensitivity. Furthermore, the use of a pulsed bipolar electrostatic particle guide permits facile ion selection for structural studies.

Accordingly, a time-of-flight mass spectrometer is provided with a first variable potential grid, and a second variable potential grid spaced from the first variable potential grid, the first grid being selectively raised to a repelling potential after a packet of ions from a source has passed by it and the second grid first selectively controlled at a repelling potential and then at a specified later time switched to a ground potential, the second grid being disposed upstream from an ion detector.

Ions of a desired range having been imparted with a positive kinetic energy drift past the first variable potential grid toward the second variable potential grid located upstream from the detector. The second variable potential grid is initially maintained at a repelling potential thereby serving as an effective ion mirror (reflectron) to the ions drifting along the flight tube. The first variable potential grid is switched to a high repelling potential at a predetermined time after the ions have passed such that the ions having been repelled by the second variable potential grid are reflected back toward the source and encounter the first variable potential grid which has been switched to a repelling potential, causing the ions to be repelled toward the detector. The second variable potential grid is switched to ground at a predetermined time such that the ions having been repelled by the first variable potential grid encounter no fields as they drift toward the detector and are detected thereby.

The advantages of this system compared to other systems include the use of multiple ion reflectors designed to increase the resolution by focusing kinetic energy differences in time. The use of multiple passes increases the effective length of the flight region by as many passes as the ions are allowed to travel, thereby increasing resolution of the mass measurements. Incorporation of an EPG in a coaxial reflectron system increases the ion transmission and therefore increases the sensitivity of the ion measurements. Utilizing a bipolar pulsing of the EPG will permit clean ion isolation of the sample ion of interest. This isolation technique coupled with the use of multiple reflectrons permits simple tandem mass spectrometry experiments to be performed. Furthermore, neutrals formed during ionization can be detected on the first pass and removed resulting in a lower background in the time-of-flight spectrum. The simplicity of this system and the elimination of the need for a second mass analyzer for tandem experiments greatly reduces the cost of this system compared to other systems having similar operational characteristics.

Therefore, it is an object of the invention to provide a linear multipass time-of-flight mass spectrometer having an extended effective flight length resulting in improved resolution and sensitivity. It is a further object to provide a time-of-flight mass spectrometer which uses a pulsed bipolar electrostatic particle guide to improve selection of ions for detection.

These advantages and objects will be better understood by reference to the description which follows.

DESCRIPTION OF THE DRAWING FIGURES

DETAILED DESCRIPTION OF THE INVENTION

Figure 1:
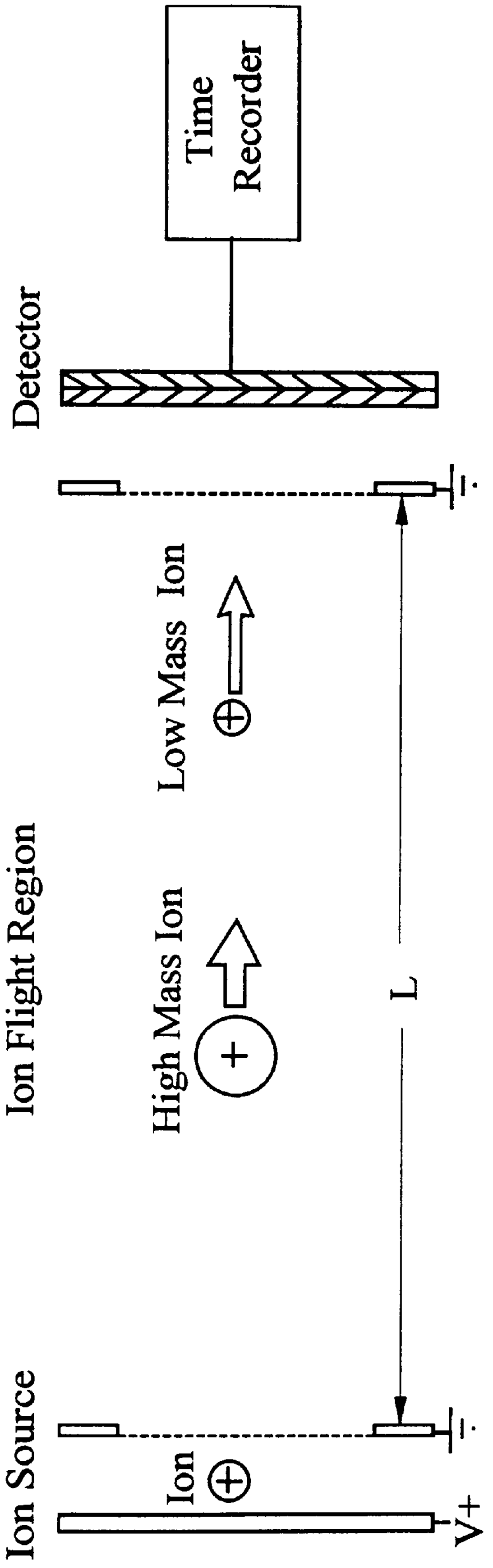
Figure 1 (PRIOR ART)
FIG. 1 is a schematic diagram of a simple prior art linear time-of-flight mass spectrometer.
Figure 2:
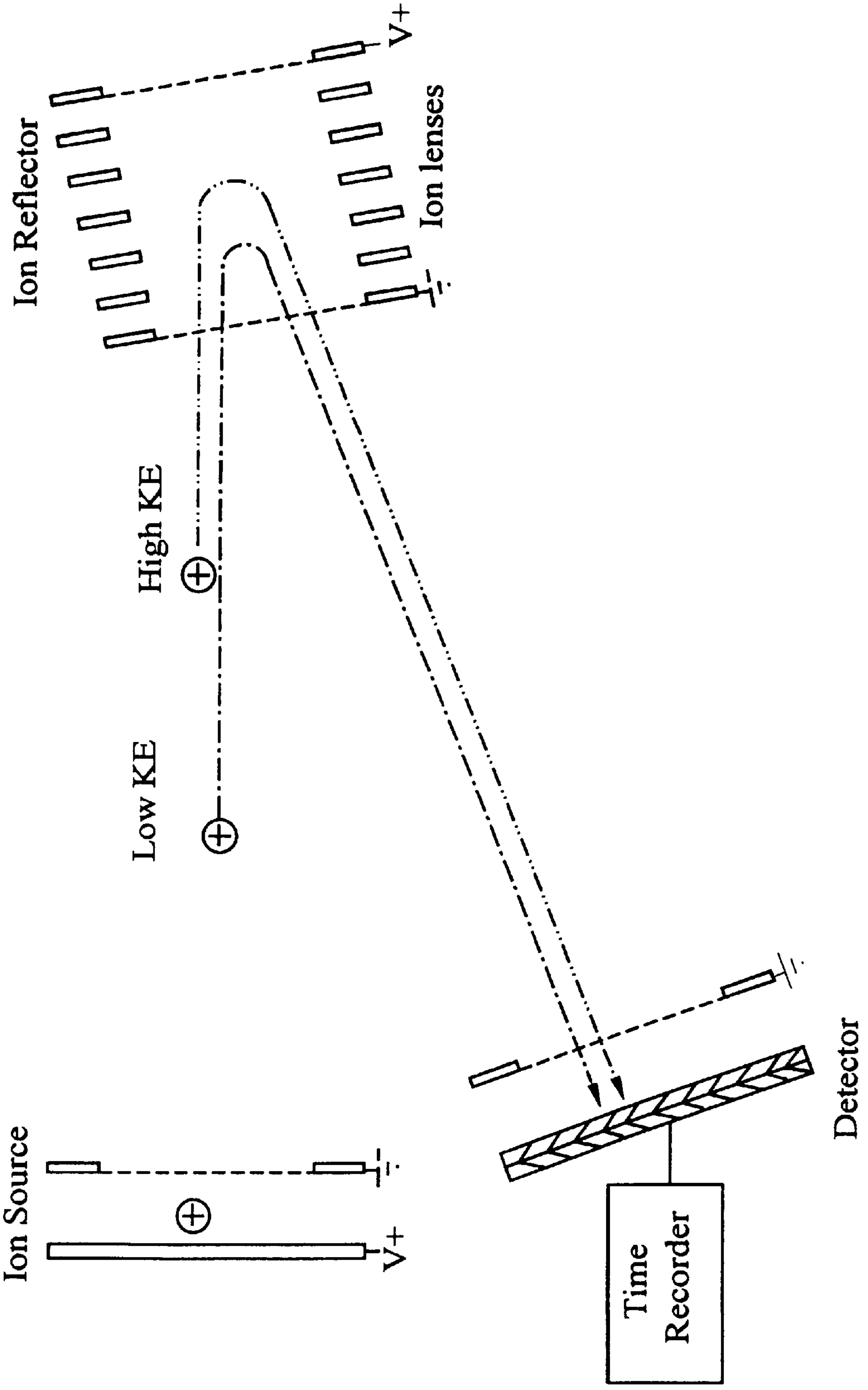
Figure 2 (PRIOR ART)
FIG. 2 is a schematic diagram of a prior art time-of-flight mass spectrometer employing an ion reflector for kinetic energy focusing.
Figure 3:
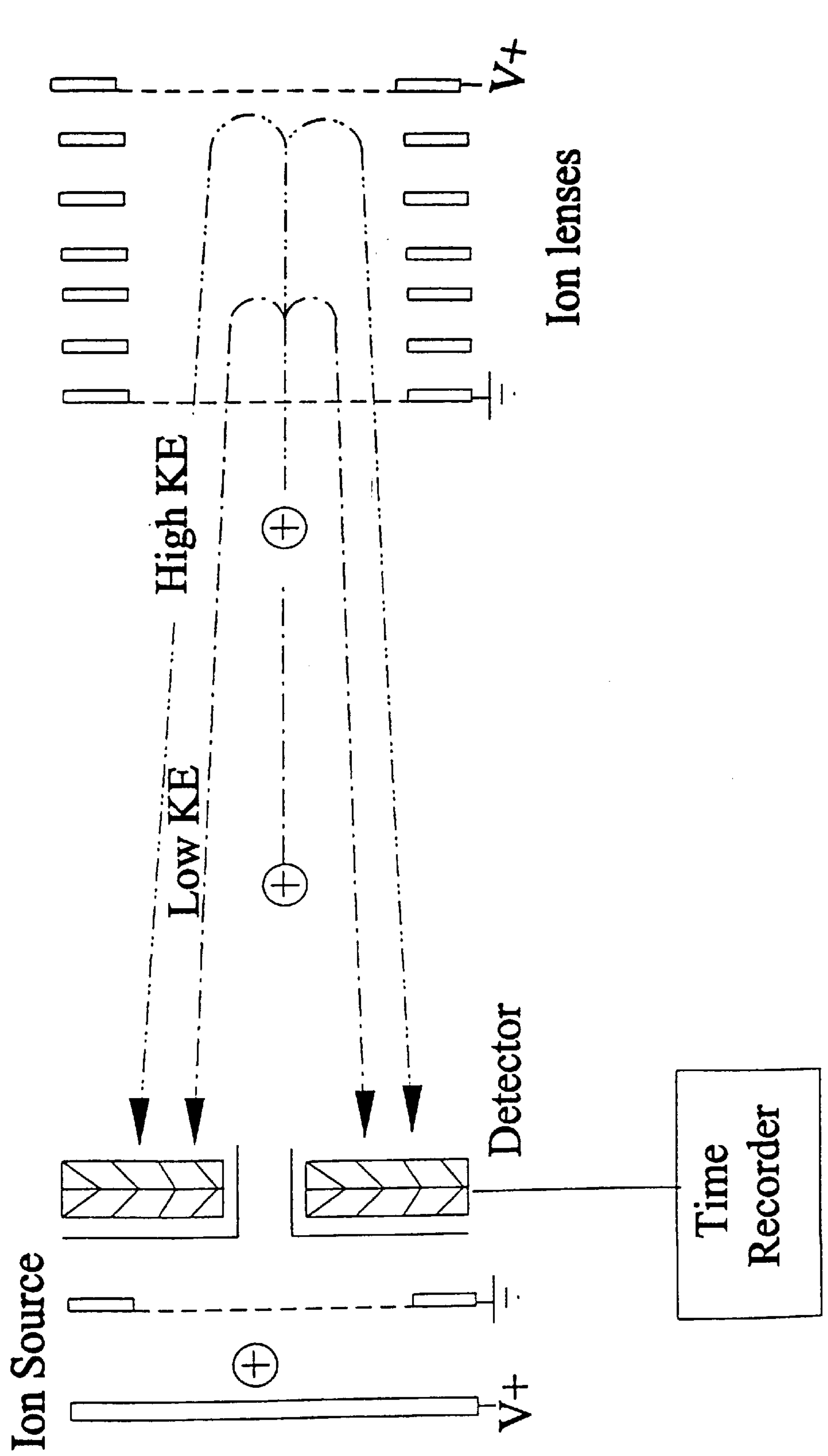
Figure 3 (PRIOR ART)
FIG. 3 is a schematic diagram of another prior art time-of-flight mass spectrometer employing a co-axial ion reflector for kinetic energy focusing with near zero-angle reflectance, the detector having a small central orifice through which the ions are introduced into the device.
Figure 4:
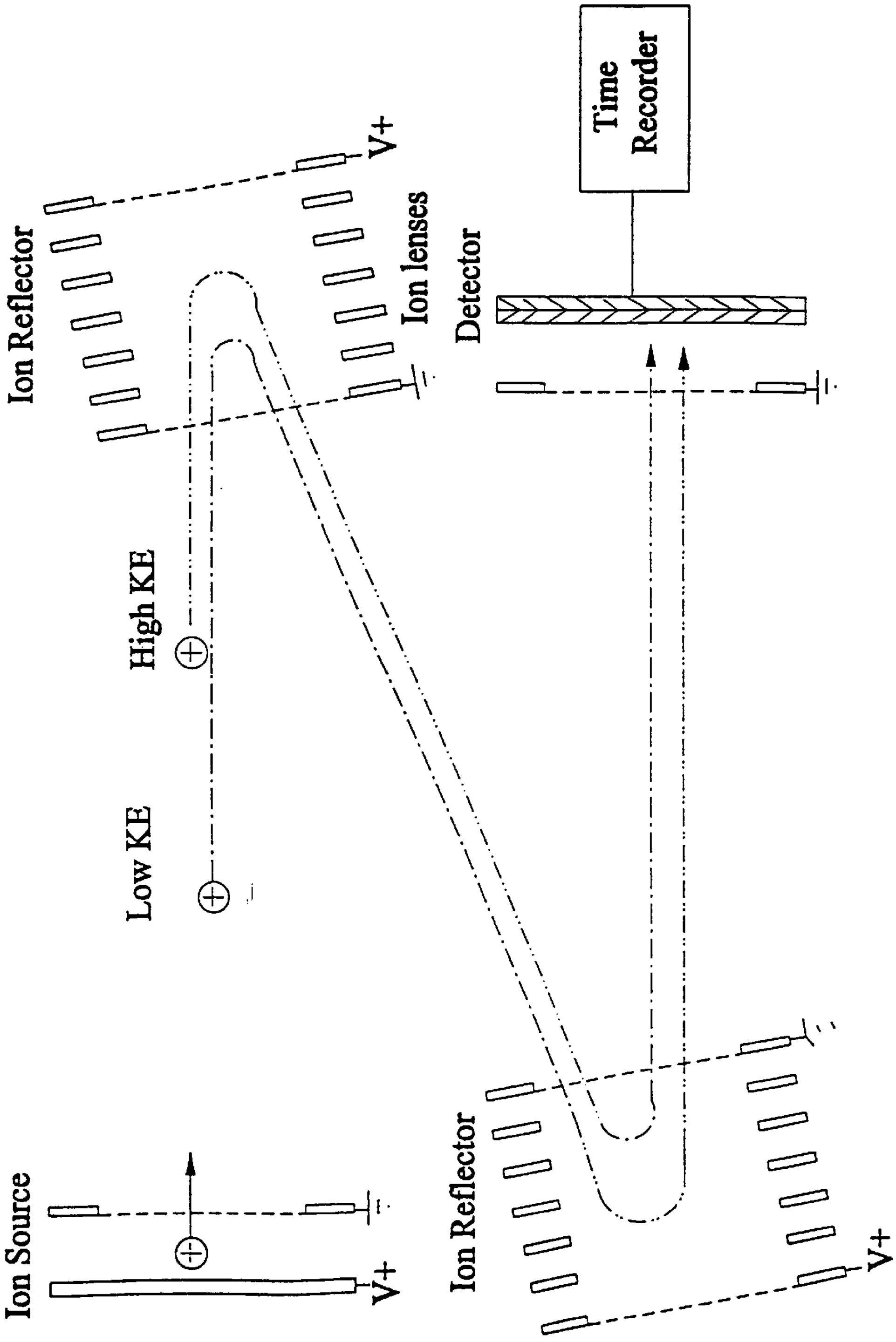
Figure 4 (PRIOR ART)
FIG. 4 is a schematic diagram of a prior art tandem time-of-flight mass spectrometer utilizing two ion reflectors on different axes.

A schematic of a simple prior art time-of-flight mass spectrometer is depicted in FIG. 1. Ions are formed in an ion source region and repelled by a charged plate having potential of V+. The ions 30 are accelerated to the flight region of the mass spectrometer where they separate on the basis of their different velocities resulting from their different masses. Their times of flight are recorded by a detector placed at the end of the ion flight region. Prior art improvements in resolution by increasing the length of the flight region and incorporation of ion reflectors are schematically illustrated in FIG. 2 and FIG. 3. FIG. 4 illustrates a prior art device which uses multiple reflectors to improve the performance characteristics of the instrument in terms of the resolution of the mass measurements. This geometry also includes the ability to do tandem or MS—MS experiments by inducing dissociation between the first and second ion reflectors.

The present invention recognizes the dependence of resolving power of the instrument on the length of the flight tube and the initial kinetic energy distribution of the ions 30. It also recognizes the improvements offered using multiple ion reflectors with near zero-angle ion reflectance.

Figure 5:
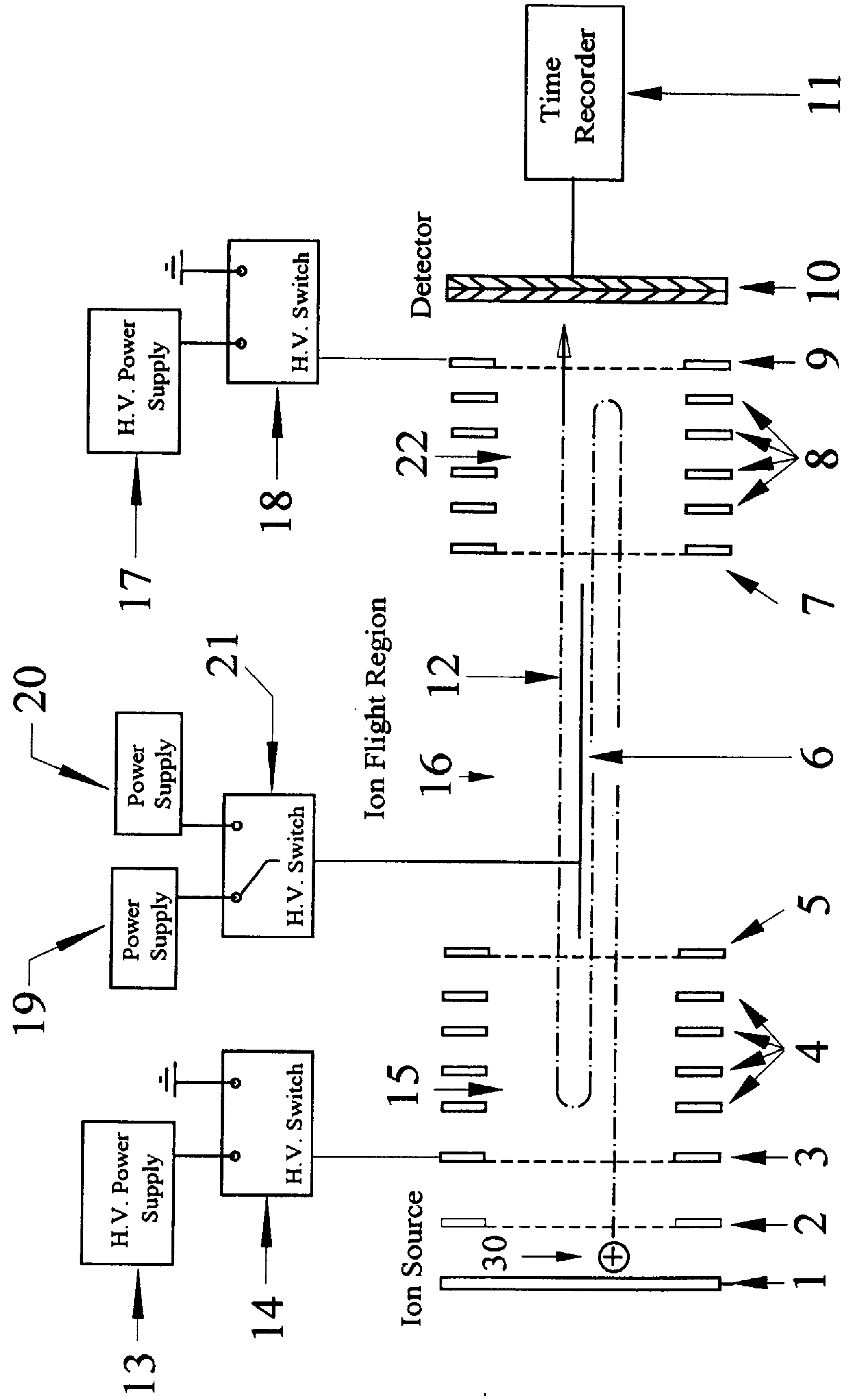
FIG. 5 is a schematic diagram illustrating the preferred embodiment of the present invention.
Figure 8:
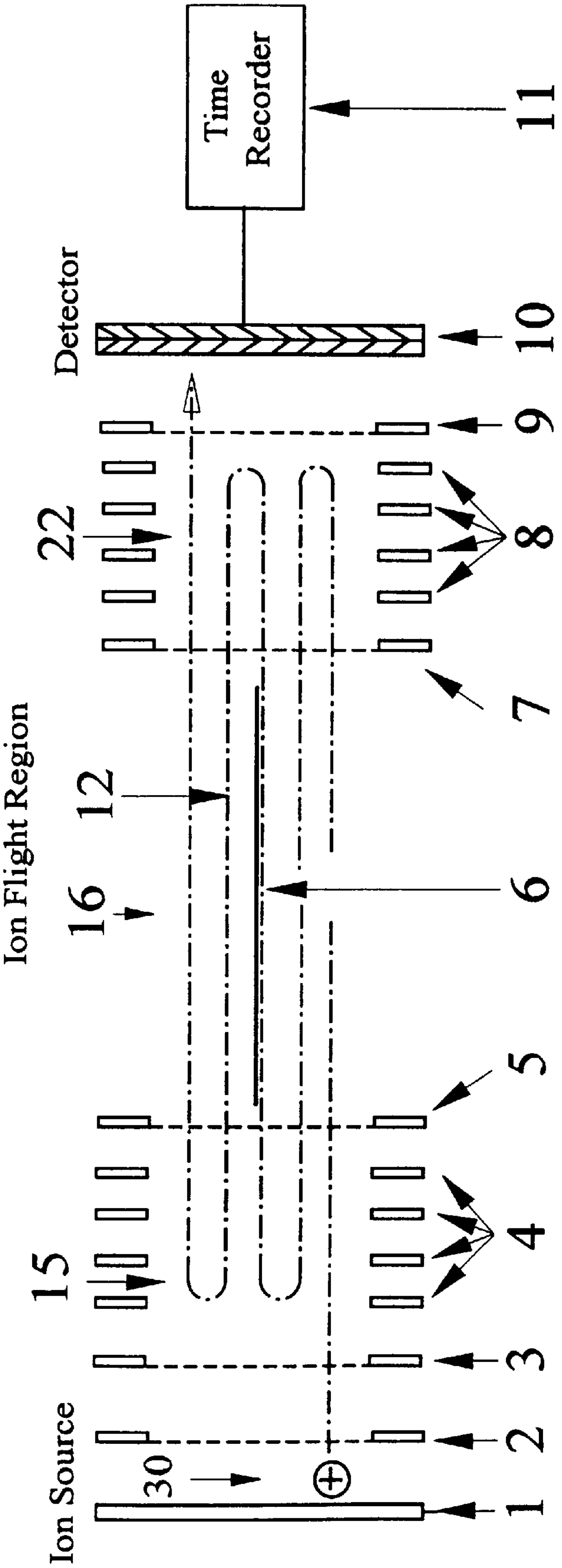
FIG. 8 is a schematic diagram illustrating multiple passes of ions along the flight axis between the two co-axial reflectrons of the present invention.

A schematic diagram of a time-of-flight mass spectrometer according to the present invention is shown in FIG. 5. In this embodiment, ions 30 are produced from a flat acceleration plate 1 that is held at an electrical potential that is higher than a ground reference. Ions 30 are produced by a pulsed laser ionizer in a region between acceleration plate 1 and an adjacent first electrode 2 that has an equal or lower electrical potential placed on it. When the electrical potential on first electrode 2 is lower than that on acceleration plate 1, the ions 30 are accelerated towards the flight axis by the potential difference between the two electrodes. A second electrode 3 (preferably a variable potential grid) is positioned adjacent to the ion source region and selectively switched between a ground potential and a high electrical potential. If second electrode 3 is at a ground potential, the ions 30 are accelerated down the flight axis through one or more additional focusing lenses 4 and a first grounded grid 5. The additional focusing lenses 4 are optionally added to produce a more homogeneous ion reflection field. Furthermore, these additional lenses can be used to produce ion reflection fields having a variety of kinetic energy focusing characteristics (i.e., linear or parabolic fields). Following acceleration, the ions 30 are guided down the flight path 12 using an electrostatic particle guide (EPG) 6. Because the field lines generated by the EPG 6 are purely radial, there is no acceleration effect upon ions 30 along the flight axis. Prior to reaching the detector 10, the ions 30 pass through a grounded electrode 7 and enter the first reflectron region 22. First reflectron region 22 may be either a single stage reflectron or may comprise a parabolic reflectron using reflectron electrodes 8. When the voltage applied to the back reflectron grid 9 (which in the embodiment illustrated is resistively coupled to the reflectron electrodes 8) is higher than the acceleration potential of first electrode 2, the ions 30 will be reflected back towards the source optics 24 in a first operative state. In a second operative state of operation, the voltage on the second electrode 3 of the source optics 24 is switched from ground to a higher positive voltage prior to the return of the ions 30 to the region of the source optics 24, such that ions 30 will be repelled by the second reflectron region 15 and be redirected back towards the detector 10. After ions 30 depart first reflectron region 22, first reflectron switch 18 is changed from its coupling of back reflectron grid 9 to high voltage power supply 17 to instead couple back reflectron grid 9 to ground. Ions 30 then will pass through the first reflectron region 22 and may strike detector 10 which generates a signal coupled to time recorder 11 to record the time of flight of ions 30. A flight path 12 for ions 30 making only three passes through the ion flight region 16 is shown. The number of passages of ions 30 between the co-axial second electrode 3 and back reflectron grid 9 is determined by the time that the voltage placed on second electrode 3 and back reflection grid 9 is held at a high electrical potential. If the voltages are held at a high potential for a longer time prior to switching, more passes can be accomplished as shown in FIG. 8, thus increasing the effective net ion flight length of the ions 30 and the number of ion reflectors encountered. The net length of the flight tube is therefore based on the time that the ions 30 are permitted to travel between the two ion reflectors.

Figure 10:
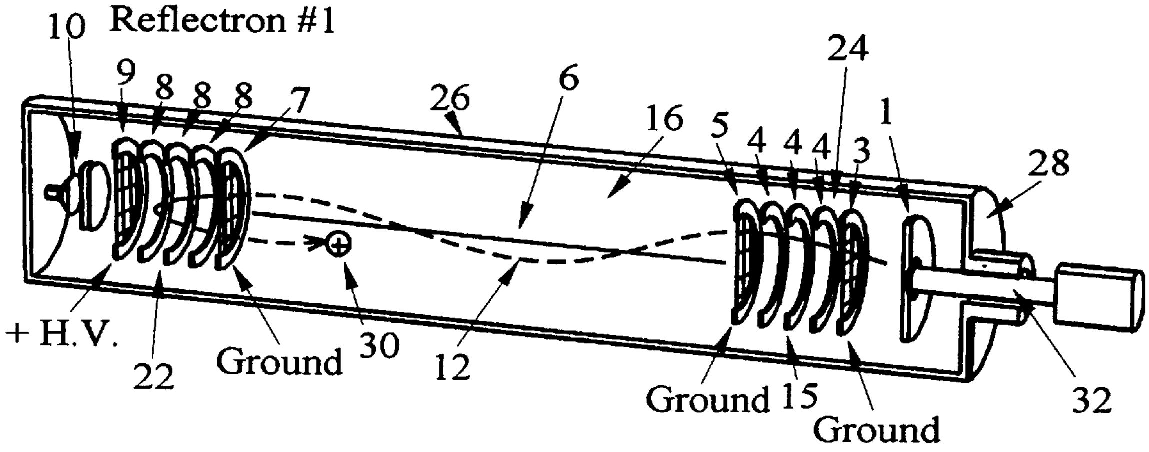
FIG. 10 is an isometric longitudinal section view of the preferred embodiment of the present invention with the path of an ion packet shown by dashed lines.

Referring further to FIG. 5 and also to FIG. 10, the time-of-flight mass spectrometer of the preferred embodiment is best comprised of an acceleration plate 1 with a power supply electrically coupled to the acceleration plate 1 for applying a variable electric potential that will repel the ions 30 for ion extraction. The voltage on this acceleration plate 1 may be changed over time to initiate the extraction of the ions 30 at a user defined time following ionization. The first electrode 2 is spaced downstream of the acceleration plate 1 and is electrically coupled to a variable power supply to apply an electric potential to the first electrode 2 to create the potential field for extraction. The second electrode 3 is spaced downstream of the acceleration plate 1 and first electrode 2 and is electrically coupled to a first high voltage switch 14. This first high voltage switch 14 can change the electric potential supplied by a first power supply 13 that is applied to this second electrode 3 at a user defined time following the ionization of the ions 30 and after the ions 30 have been extracted from the source region. The ability to switch the voltage on the ion reflectrons during the time that the ion is traveling through the ion flight region is critical to operation. Because operations are done at high voltage (in the range of 5 kV–20 kV), the voltage on the second electrode 3 must be switched from ground potential to a potential greater than the source potential (5 kV–20 kV) in less than 1 microsecond. A suitable pulse generator capable of an output voltage swing of 20 kV with rise and fall times of less than 60 ns is available through Eurotek, Inc. of Morganville, N.J. By changing to a high voltage on this first high voltage switch 14, an ion repelling field is created in the ion flight region 16. Additional focusing lenses 4 may optionally be added to create a potential field that will better focus the ions 30. First grounded grid 5 is located downstream of the second electrode 3 to define the potential field of the second electrode 3 when it is switched to high voltage.

An electrostatic particle guide 6 is preferably located in the ion flight region 16 downstream of the source optics 24. This electrostatic particle guide 6 is electrically connected to EPC voltage switch 21 which may be an electronic switch 21 that can apply different electrical potentials to the electrostatic particle guide 6 from electrostatic particle guide power supplies 19 and 20. By switching between the potentials of alternate electrostatic particle guide power supplies 19 and 20, the electrostatic particle guide 6 can be used to increase the ion transmission through the system or to selectively eject ions from the ion flight path 16. Grounded electrode 7 is located downstream of the ion flight region 16 and defines the beginning of the first reflectron region 22. Additional focusing reflectron electrodes 8 may be added to create a potential field that will better focus the ions 30 in the first reflectron region 22.

Back reflectron grid 9 is spaced downstream of the ion flight region 16 and is electrically coupled to a second high voltage switch, first reflectron switch 18. The voltage on the back reflectron grid 9 must be switched between 0 and 6 kV in less than 1 microsecond by a suitable pulse generator. Second high voltage switch, first reflectron switch 18 can change the electric potential supplied by a second power supply 17 that is applied to this back reflectron grid 9 at a user defined time following the ionization of the ions 30 and after the ions 30 have been extracted from the source region. By switching to a high voltage on first reflectron switch 18, a first ion repelling field is created in the first reflectron region 22. If the electrical potential applied to second electrode 3 and back reflectron grid 9 is at a sufficiently high voltage to repel the ions 30, an ion flight path 12 will occur that will allow multiple passes of the ions 30 through the ion flight region 16. When the potential applied to back reflectron grid 9 is switched to a lower voltage, the ions 30 will no longer be repelled and will then strike the detector 10 and the time of flight of the ions 30 will be recorded using a time recorder 11. If the potential applied to back reflectron grid 9 is held at a high electrical potential for an extended period of time, the flight path 12 of the ions 30 will contain more passes through the ion flight region 16.

Because the ions are reflected between first reflectron region 22 and second reflectron region 15 for as long as high voltages are applied, the net length of the ion flight is determined by the length of time prior to switching the voltage on back reflectron grid 9 in front of the detector 10 to a ground potential.

The states of operation of the preferred embodiment time-of-flight mass spectrometer are further illustrated in FIGS. 10, 10A, 11 and 11A.

Figure 11:
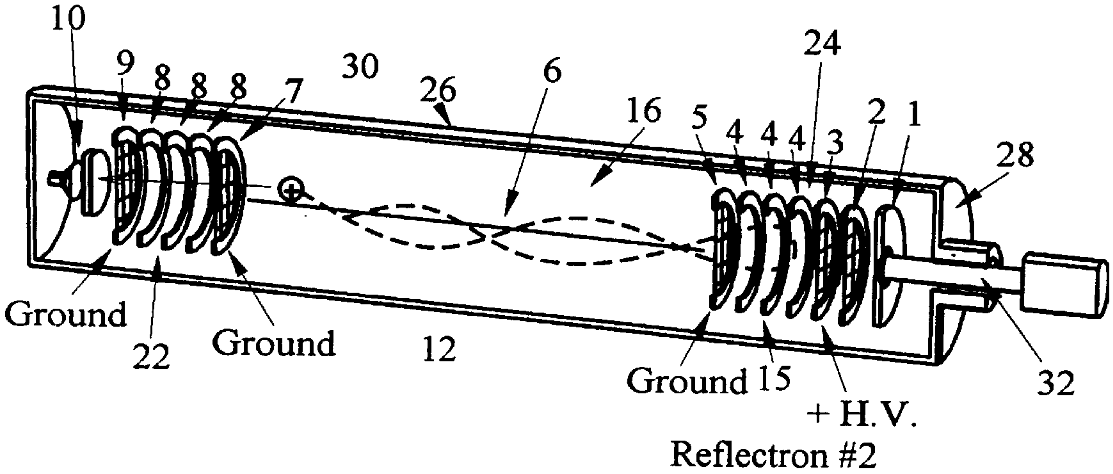
FIG. 11 is an isometric longitudinal section view of the preferred embodiment of the present invention showing by dashed lines the flight path of an ion packet having encountered the second variable potential grid of the invention.
Figure 11A:
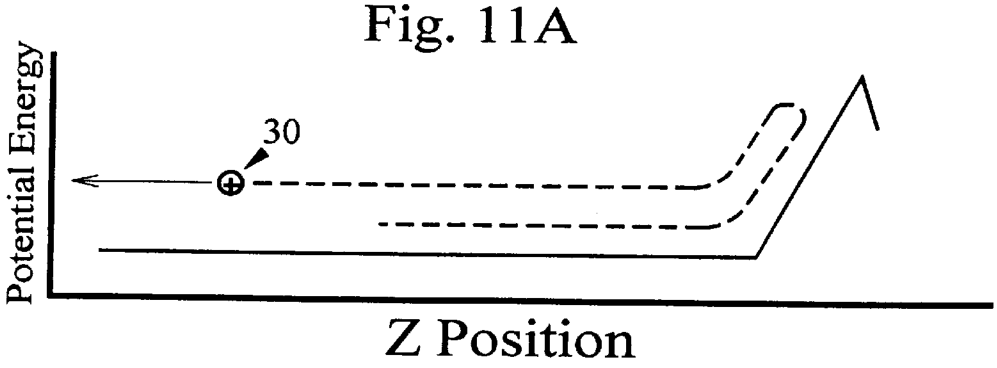
FIG. 11A is a graph illustrating the trajectory of an ion packet relative to the potential energy of the back reflectron grid and of the second electrode in the operative state corresponding to FIG. 11.

A longitudinal section view of a time-of-flight mass spectrometer according to the present invention is illustrated in FIGS. 10 and 11. In FIG. 10, a first operative state of flight tube 26 is shown. Flight tube 26 comprises a sealed evacuable housing 28 which is pneumatically coupled to a vacuum pump capable of maintaining a background pressure of approximately $5\times10^{-9}$ Torr in the housing 28. Sample molecules to be analyzed are placed on a vacuum insertion probe 32 and then ionized by an ionizer which may be a pulsed energy source such as a pulsed laser, electron beam, or particle beam. Insertion probe 32 is placed in contact with acceleration plate 1 from which ions 30 are imparted with a relatively high electrical potential in the range of 5 to 20 kV and are accelerated past source optics 24 comprising initially grounded second electrode 3, focusing lenses 4 and grounded grid 5. Ions 30 enter the elongate ion flight region 16 of flight tube 26 in which is longitudinally generally centrally disposed an electrostatic particle guide 6 which comprises a selectively charged wire. Ions 30 drift toward first reflectron region 22 which is disposed adjacent and ahead of detector 10. After entry into first reflectron region 22, ions 30 approach back reflectron grid 9 which initially is charged at a high potential at least higher than the potential of the acceleration plate 1. Ions 30 are repelled by back reflectron grid 9 and reverse direction to be redirected toward source optics 24 through ion flight region 16.

FIG. 11 illustrates the time-of-flight mass spectrometer of the present invention in a second operative state. Before ions 30 approach first grounded grid 5 on their return path toward the source optics 24, the potential of second electrode 3 is switched from ground to a potential at least as high as the potential of back reflectron grid 9 in the first operative stage of the invention. As ions 30 then approach second electrode 3 of source optics 24, they decelerate and are repelled by second electrode 3 and are redirected into ion flight region 16 to drift toward detector 10. Before ions 30 reach first reflectron region 22, the potential applied to back reflectron grid 9 is switched to ground, thereby allowing ions 30 to continue toward and subsequently strike detector 10.

In both first and second operative states of the invention, ions 30 are focused along flight path 12 by the radial field emanating from electrostatic particle guide 6 which may be bipolar pulsed. The disclosure of Hanson and Just, Analytical Chemistry Vol. 66 No. 21 at pp. 3676–3680 is hereby incorporated relating to bipolar pulsing of an EPG.

Figure 10A:
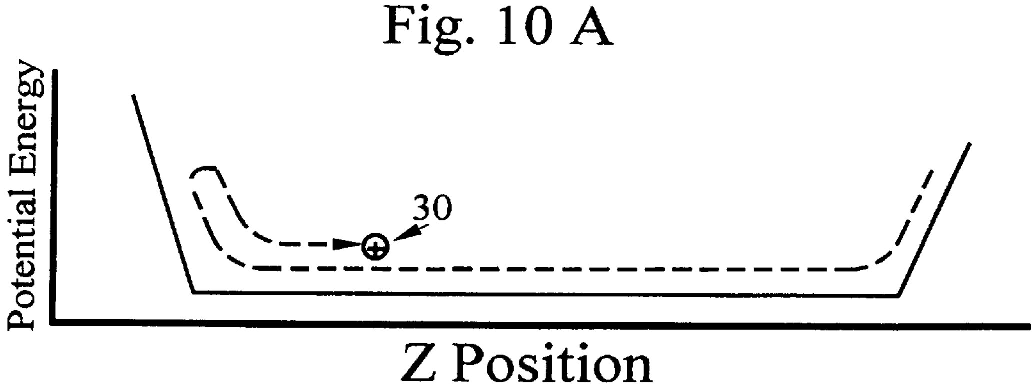
FIG. 10A is a graph illustrating the trajectory of an ion packet relative to the potential energy of the back reflectron grid and of the second electrode in the operative state corresponding to FIG. 10.

FIG. 10A graphically illustrates the potential energy of the electrodes of flight tube 26 corresponding to the first operative state of the invention shown in FIG. 10.

Similarly FIG. 11 A graphically illustrates the potential energy of the electrodes of flight tube 26 corresponding to the second operative state of the invention shown in FIG. 11.

Using this apparatus, the tandem mass spectrometry experiment can be performed by studying the dissociation products of the sample ions 30 between the first and second ion reflectron regions 15 and 22. Ions 30 of interest can be selected using the electrostatic particle guide 6 and allowed to dissociate, and the mass of the fragment ions 30 can then be measured by adjusting the two reflecting potentials to allow only a narrow kinetic energy distribution to arrive at the detector 10. Allowing multiple passes of the photodissociated ions 30 prior to switching the first reflectron region 22 to ground would increase the flight path 12 and therefore, resolution of the mass spectrum.

Figure 9:
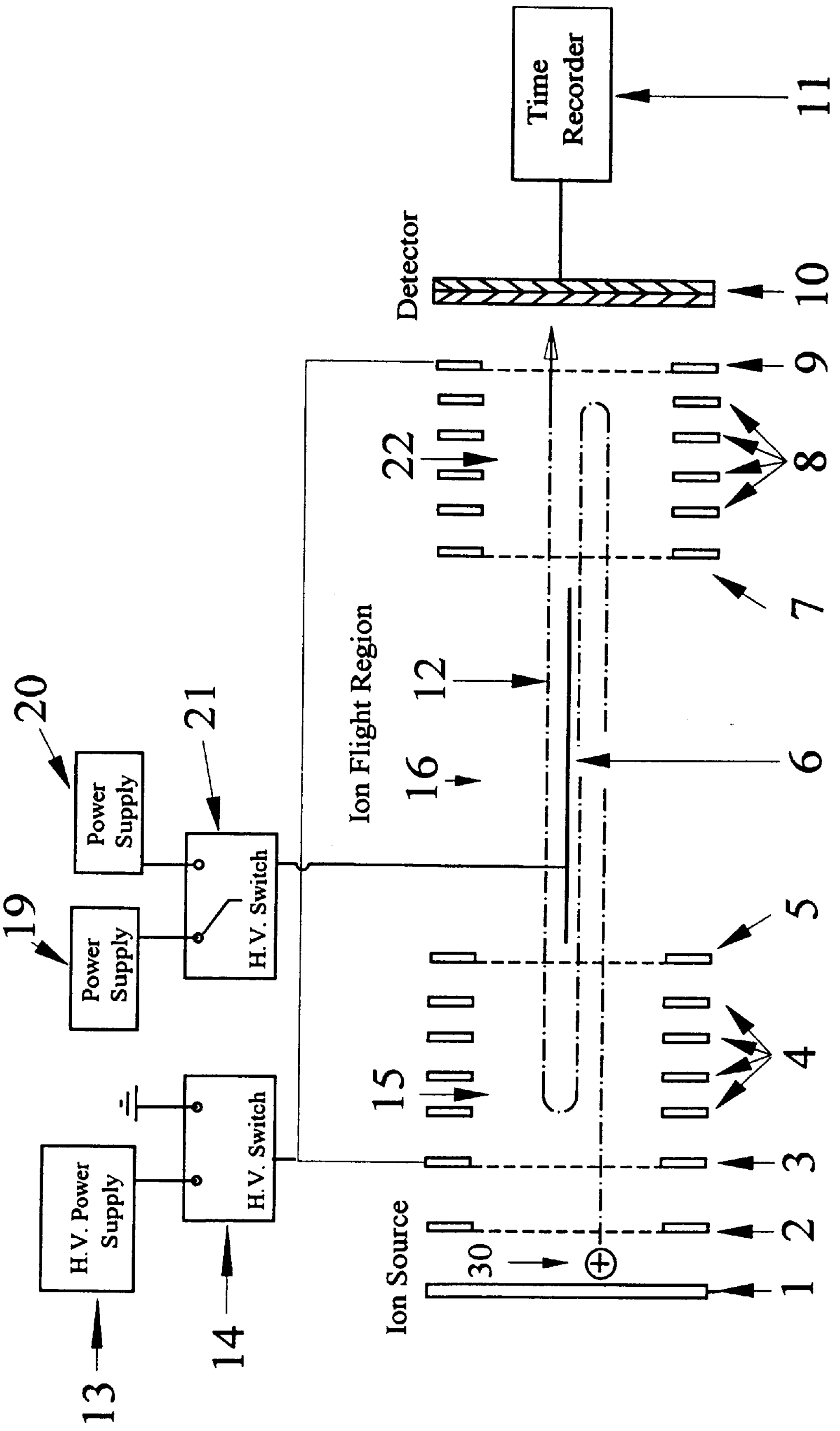
FIG. 9 is a schematic diagram illustrating an alternate embodiment of the present invention.

An alternate embodiment of the invention is shown in FIG. 9. In this embodiment the two co-axial ion reflector regions 15 and 22 are connected to a single switch 14. This operation simultaneously raises and lowers the potential barriers created by the ion reflectron regions while the ion is in the ion flight region 16.

EXAMPLE 1

Figure 6:
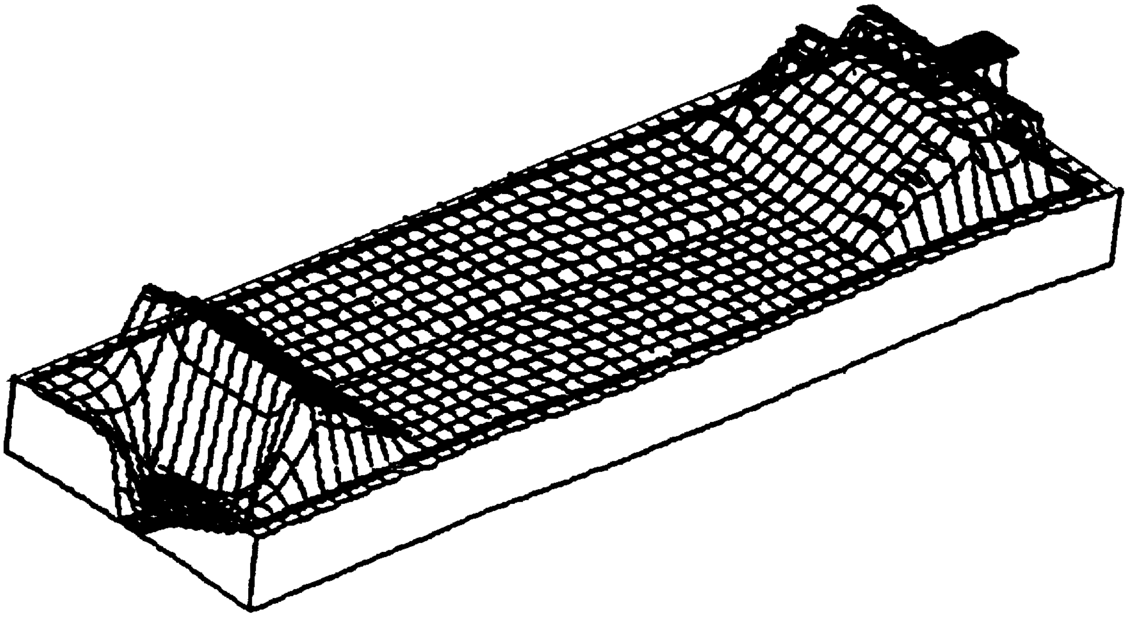
FIG. 6 is a graphical representation of one possible potential energy surface generated by the preferred embodiment time-of-flight mass spectrometer illustrated in FIG. 5 in one operative state.
Figure 7:
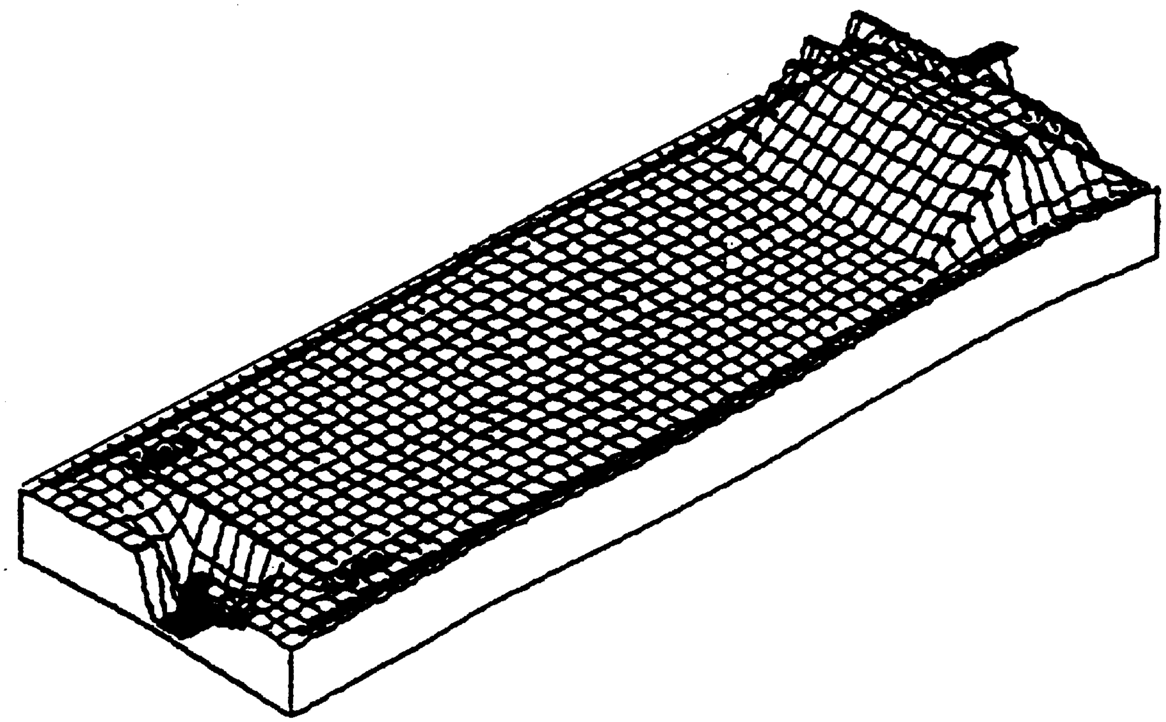
FIG. 7 is a graphical representation of an alternative potential energy surface generated by the preferred embodiment time-of-flight mass spectrometer illustrated in FIG. 5 in another state.

In addition to extending the net flight length, the ion mirrors also act as kinetic energy focusing devices similar to the reflectron. This approach has been theoretically studied using the electro-optics simulation program SIMION version 6.0 available from D. A. Dahl, Idaho National Laboratory, Idaho Falls, Id. SIMION allows placement of electrodes in a user defined array, permitting equipotential electric field lines to be calculated. Voltage gradients are calculated for the points which surround a specific ion's location in the potential array resulting in the ability to predict ion trajectories in a theoretical system. Using this approach, the potential surfaces generated by the reflectrons under the operating conditions for the proposed system were modeled. See FIGS. 6 and 7. A user defined program was written to simulate the multi-pass system which permitted a numerical simulation of the proposed system. Data was collected for two ions of mass 100 having initial kinetic energies of 1000 eV and 1100 eV. Under typical conditions, this difference in kinetic energies would result in loss of resolution of the ions due to dramatic differences in the flight time, but using the focusing characteristics of the double reflectron system, the ions arrived at the detector at the same time. This focusing of arrival times for ions having the same mass but different kinetic energies illustrates an improvement in resolution.

EXAMPLE 2

Figure 12:
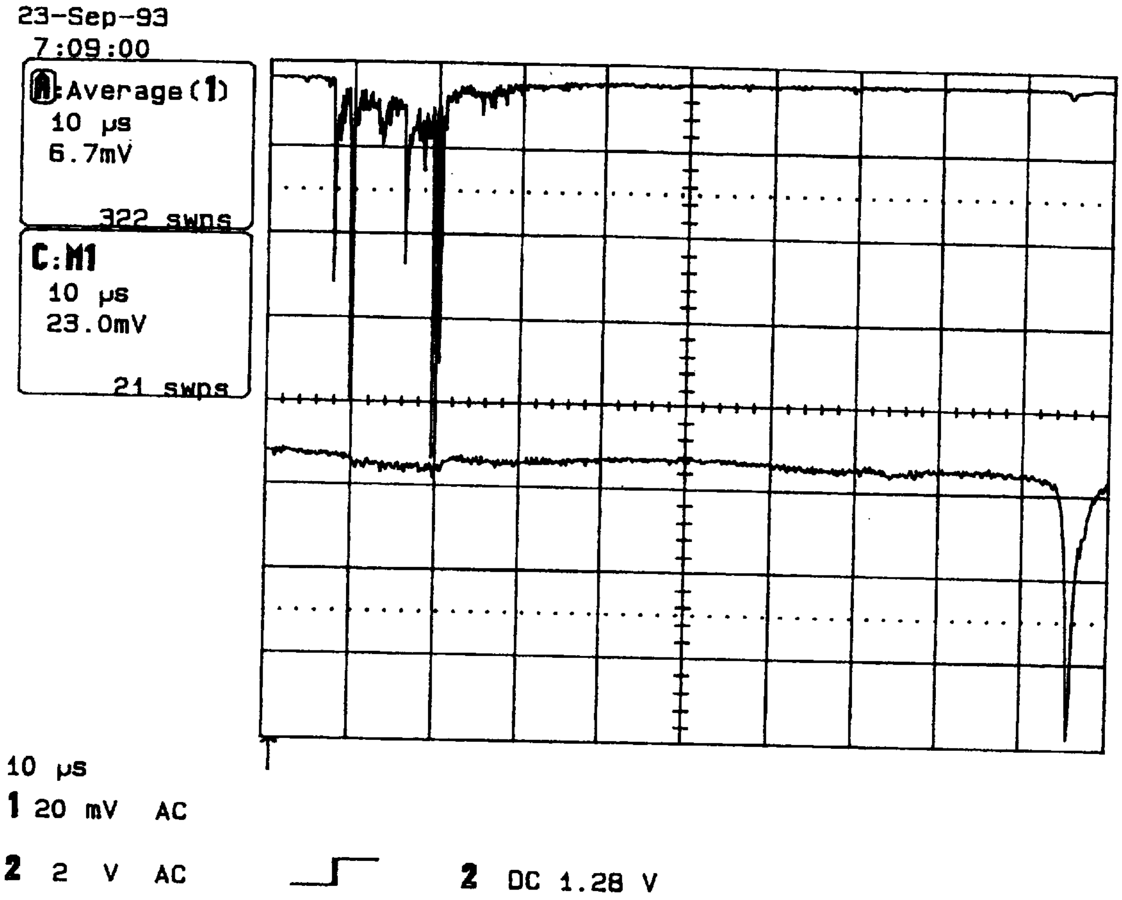
FIG. 12 is a graph showing two spectra of Bovine insulin determined by a technique of bipolar pulling of an electrostatic particle guide of a time-of-flight mass spectrometer.

Along with high resolution mass measurements, ion selection for tandem experiments is made possible through the use of the electrostatic particle guide (EPG) that is located between the two ion reflectors. Rapid bipolar pulsing of an EPG has been developed at the University of Northern Iowa, Cedar Falls, Iowa, and provides a method of both ion deflection and enhanced ion transmission for time-of-flight mass spectrometry. This mode of operation effectively eliminates the intense low mass component of the spectrum which normally saturates microchannel plate (MCP) detectors, while at the same time transporting the higher mass component with high efficiency. Shown in FIG. 12 are two spectra of Bovine Insulin (m/z 5,730) acquired using the bipolar pulsing technique on the time-of-flight mass spectrometer at the University of Northern Iowa. The top spectrum shows the intense background signal created by the matrix used for the ionization of the molecule. This signal is so large that the detector is saturated before the arrival of the Insulin molecules (seen as a small peak at 95 μsec.). By selectively eliminating the low molecular weight matrix ions, the signal was enhanced by more than an order of magnitude. Furthermore, an EPG does not introduce radially inhomogeneous field lines compared to ion deflection using flat plates and therefore does not result in positionally dependent ion acceleration which causes loss of resolution.

EXAMPLE 3

Figure 13A:
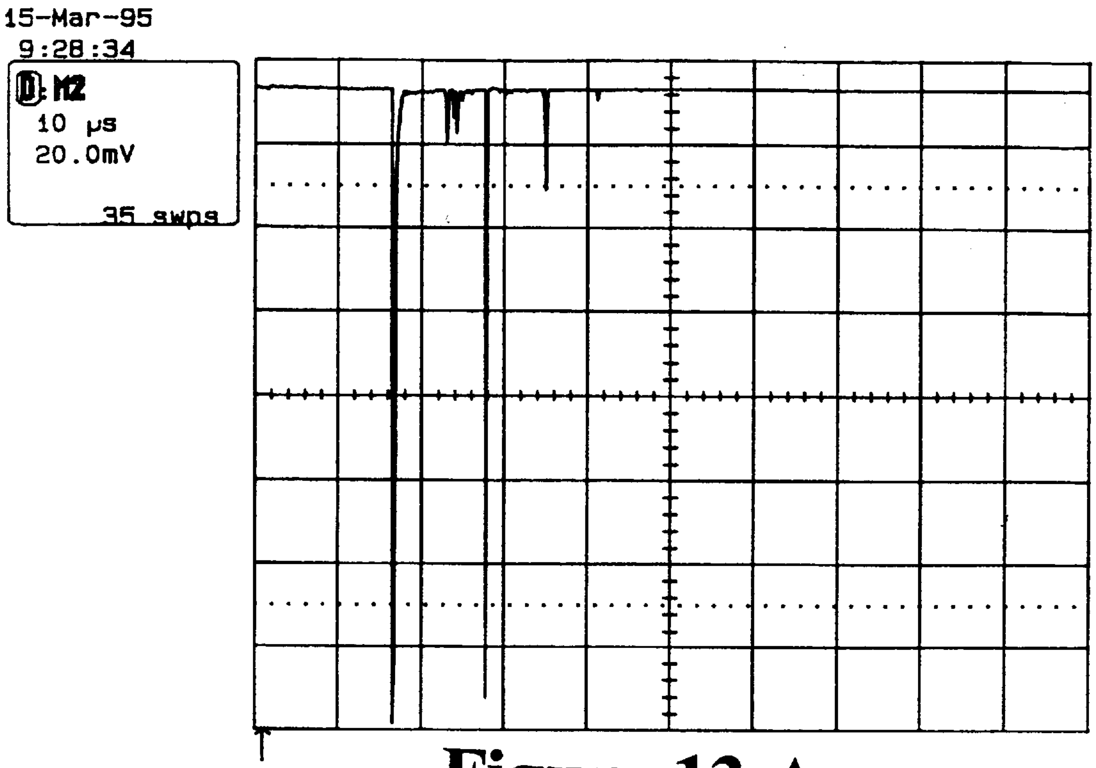
FIG. 13A is a graph showing a first spectra of Cesium Iodide cluster ions as determined by a technique of bipolar pulsing of an electrostatic particle guide of a time-of-flight mass spectrometer.
Figure 13B:
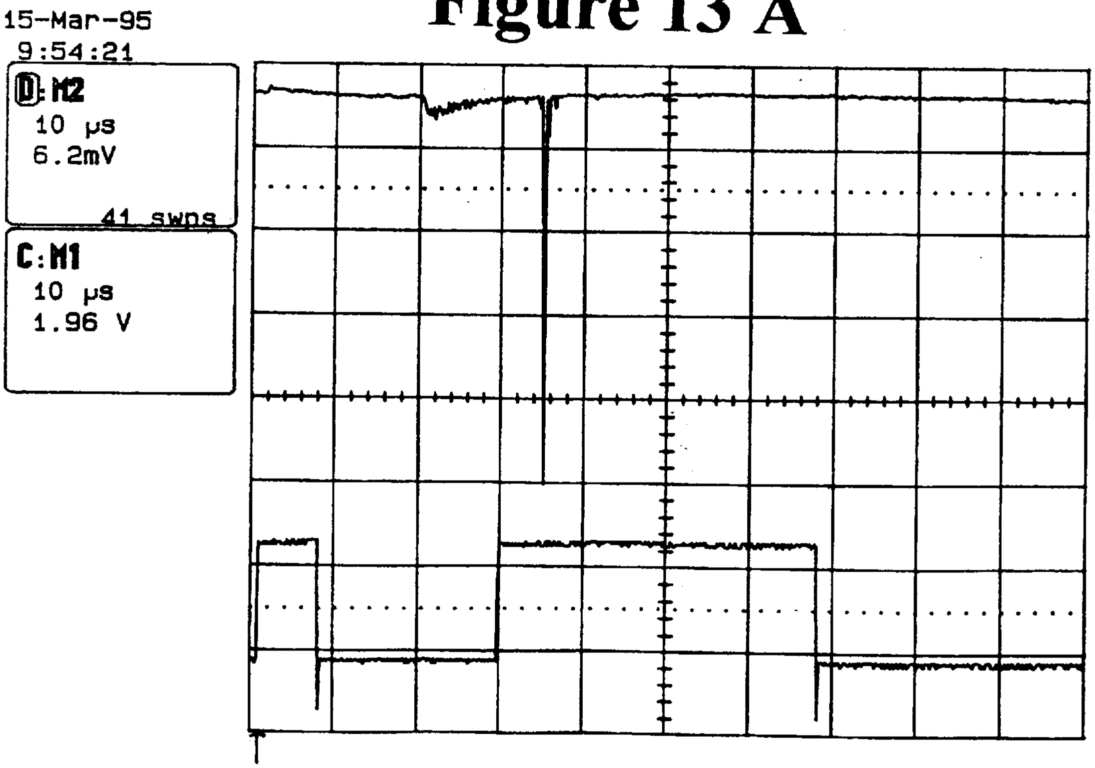
FIG. 13B is a graph showing a second spectra of Cesium Iodide cluster ions as determined by a technique of bipolar pulsing of an electrostatic particle guide of a time-of-flight mass spectrometer.

Incorporation of the EPG also permits simple ion selection by utilizing a multi-pulse sequence. In such a sequence, the first pulse may be used to eliminate low mass ions while subsequent pulses may be used to eliminate unwanted ions after the ions to be studied have arrived at the detector. In an experiment using a bipolar pulsed EPG to isolate ions, ions are isolated on the basis of their radial flight times and then selected ions are analyzed using the axial flight times. This ability to selectively eliminate ions is illustrated in FIGS. 13A, 13B. Shown in FIGS. 13A, 13B are two spectra of Cesium Iodide cluster ions again recorded using the time-of-flight instrument at the University of Northern Iowa. The spectrum of FIG. 13A contains peaks corresponding to $Na^+$ ions (16 μsec.), $Cs^+$ ions (27 μsec.), $Cs(CsI)^+$ ions (35 μsec.), and $Cs(CsI)_2^+$ ions (42 μsec.). These ions are formed from clustering reactions that occur during laser desorption and are typically used as calibration peaks in TOF mass spectrometry. As shown in FIG. 13B using a multi-pulse bi-polar switching of the voltage on the EPG, all of the ions contained in the mass spectrum are eliminated except for those corresponding to $Cs(CsI)^+$ ions. The ability to select specific ions for chemical study expands the capability of the multi-pass system to perform tandem mass spectrometry experiments without the addition of a second mass analyzer.

Having described the invention, I claim:

1. A time-of-flight mass spectrometer, comprising a sealed housing containing a source region, an ion flight region, and a detector region, a vacuum pump for maintaining a vacuum within the housing, a sample holder for supporting a sample, or an area in which a sample is ionized from a gaseous state, a sample ionizer for producing ions from the sample, one or more charged electrodes in the source region to accelerate the ions through the ion flight region, a first ion reflector comprising at least one externally switched electrode and disposed between the source region and the ion flight region, a second ion reflector comprising at least one externally switched electrode and disposed between said ion flight region and the detector region, said second ion reflector coaxial with said first ion reflector, an ion detector located downstream of the second ion reflector to detect the ions as a function of time.

2. The time-of-flight mass spectrometer of claim 1 wherein the ionizer is a pulsed energy source, a laser or pulsed particle beam, or a pulsed electron beam.

3. The time-of-flight mass spectrometer of claim 1 wherein an electrostatic particle guide is longitudinally disposed within the ion flight region to enhance the ion transmission in the flight region.

4. The time-of-flight mass spectrometer of claim 3 wherein the electrostatic particle guide has a selectively applied potential coupled thereto.

5. The time-of-flight mass spectrometer of claim 1, further comprising means for externally controlling the potential applied to the electrodes of said source region for accelerating the ions towards the detector.

6. The time-of-flight mass spectrometer of claim 1, further comprising means for independently externally controlling the potential applied to each of the electrodes in the first and second ion reflectors.

7. The time-of-flight mass spectrometer of claim 1, further comprising means for externally controlling the timing of the potentials applied to the electrodes of the first and second ion reflectors.

8. The time-of-flight mass spectrometer as described in claim 3, further comprising means for externally controlling the voltage placed on the electrostatic particle guide.

9. The time-of-flight mass spectrometer as described in claim 3, further comprising means for externally controlling the timing of the voltage coupled to the electrostatic particle guide.

10. The time-of-flight mass spectrometer of claim 1, further comprising said one or more charged electrodes of said source region are electrically coupled to a first power supply, said first power supply is selectively variable, said at least one electrode of said first ion reflector is selectively electrically coupled to a second power supply or to ground through a first high voltage switch, said at least one electrode of said second ion reflector is selectively electrically coupled to ground or to a third power supply through a second high voltage switch, said first high voltage switch selectively changeable at a user defined time after said ions have been accelerated by said electrodes of said source region, said second high voltage switch selectively changeable at a user defined time after said ions have been accelerated by said electrodes of said source region.

11. The time-of-flight mass spectrometer of claim 3 wherein said electrostatic particle guide is electrically coupled to a switchable electronic power supply.

* * * * *